United States Patent [19]

Blumhardt

[11] Patent Number: 5,533,106
[45] Date of Patent: Jul. 2, 1996

[54] METHOD AND SYSTEM FOR PROCESSING CALLS WHEREIN THE DISPLAY OF CALLING PARTY ID INFORMATION HAS BEEN INHIBITED

[75] Inventor: Mark S. Blumhardt, Niwot, Colo.

[73] Assignee: US WEST Technologies, Inc., Boulder, Colo.

[21] Appl. No.: 267,090

[22] Filed: Jun. 27, 1994

[51] Int. Cl.⁶ .......................... H04M 15/00; H04M 1/56
[52] U.S. Cl. .......................... 379/142; 379/127; 379/130
[58] Field of Search .................................. 379/127, 130, 379/142, 188, 189, 199, 200, 201, 207, 245–247

[56] References Cited

U.S. PATENT DOCUMENTS

| | | | |
|---|---|---|---|
| 4,914,689 | 4/1990 | Quade | 379/142 |
| 5,031,205 | 7/1991 | Phillips | 379/199 |
| 5,033,076 | 7/1991 | Jones | 379/142 |
| 5,161,181 | 11/1992 | Zwick | 379/142 |
| 5,247,571 | 9/1993 | Kay | 379/207 |
| 5,276,731 | 1/1994 | Arbel | 379/199 |
| 5,309,508 | 5/1994 | Rosen | 379/142 |
| 5,311,572 | 5/1994 | Friedes | 379/207 |
| 5,341,411 | 8/1994 | Hashimoto | 379/189 |

Primary Examiner—Stephen Chin
Assistant Examiner—Vijay Shankar
Attorney, Agent, or Firm—Brooks & Kushman

[57] ABSTRACT

A method and system directed for use in an Advanced Intelligent Network (AIN) for detecting and processing calls from a calling party to a subscribing called party wherein the display of calling party ID information has been inhibited. The Advanced Intelligent Network includes at least one Service Switching Point (SSP) in electrical communication with a Service Control Point (SCP) or Adjunct Processor (AP) via an appropriate signaling link and having corresponding service logic. The system and method are operative to detect an AIN termination attempt trigger at the SSP, suspend normal call processing, and generate an AIN termination attempt message at the SSP for receipt by the SCP/AP requesting further call processing instructions. If it is determined that calling party ID information has been inhibited, a response message is generated at the SCP/AP for receipt by the SSP instructing the SSP to intercept the call, play a selected terminating announcement or request the calling party to display its ID information so as to perform further call processing.

7 Claims, 4 Drawing Sheets

METHOD AND SYSTEM FOR PROCESSING CALLS WHEREIN THE DISPLAY OF CALLING PARTY ID INFORMATION HAS BEEN INHIBITED

TECHNICAL FIELD

This invention relates generally to Advanced Intelligent Network (AIN) services and, more particularly, to a method and system for detecting and processing calls from a calling party to a subscribing called party wherein the display of calling party ID information has been intentionally inhibited and/or is not available.

BACKGROUND ART

Calling Number Delivery (CND), sometimes referred to as "Caller ID" is a Class$^{SM}$ feature presently offered by the Regional Bell Operating Companies (RBOCs). This service, which is intended for residential and small business telephone customers, allows Customer Premises Equipment (CPE) devices to receive a calling party's Directory Number (DN) and the date and time of the call during the ringing cycle.

As promoted, CND permits users i.e. called parties, to recognize familiar numbers so as to decide whether to accept the call and, if so, to prepare a response. The CND feature also provides for storage of the directory numbers of the calling parties generally along with the date and time of the call for later retrieval. From a convenience standpoint, the CND feature provides calling parties the ability to determine with limited accuracy who in the called party household the call is likely directed to. Moreover, the feature provides the subscriber with a desired sense of security in that unwanted calls may be readily traced.

As those skilled in the art will recognize, when the CND feature is activated on a line, the calling DN of a terminated call is transmitted along with the date and time to the called party CPE. For an interoffice call, the caller's DN is transferred during the call set-up from the originating Stored Program Control System (SPCS) to which the calling party is connected, to the terminating SPCS to which the called party is connected. The caller's DN is thereafter transmitted along with the date and time of the call, from the terminating SPCS to the called party CPE during the first long silent interval of the ringing cycle, i.e. an interval of silence lasting 3 or more seconds.

Similarly, for an intraoffice call, the caller's DN is retrieved from SPCS memory for transmission to the called party CPE. Then, depending on the options offered by the called party CPE, the DN may be displayed and/or printed out. In alternative arrangements, the called party CPE may be structured to store the DN and date and time for later retrieval by the customer as referenced above. CND is presently offered to users on both a subscription basis and a usage-sensitive basis. The latter requires the CND customer to activate or deactivate the service by going off-hook, awaiting a dial tone and dialing an appropriate activation/ deactivation code.

Because CND services require that both the calling party and the called party be in specially-equipped areas to work, situations may arise where the DN of the calling party is not available. In such a case, an out-of-area/DN-unavailable (O/U) indicator, generally signified by the letter "O", along with the date and time will be transmitted to the called party CPE in place of the calling line DN. Similarly, if the calling party DN has been marked to indicate that it is private, the terminating SPCS will not transmit the DN to the called party CPE. This latter option, commonly referred to as Caller Number Delivery."blocking", may generally be selected by the calling party by dialing a specified code (*67 for touch-tone phones, 1167 for rotary/pulse phones) prior to placing the call. Following entry, a stutter dial tone, followed by a second dial tone, is generally provided to confirm the blocking process. Where Calling Number Delivery blocking has been selected, the terminating SPCS will send only the date and time and a privacy indicator, generally signified by the letter "P", to the CPE in place of the calling line DN. This information will indicate to the called party that the calling party has invoked the privacy capability.

As readily seen, the unavailability of CND service in selected calling areas coupled with the ability of perhaps the most undesirable callers to select the "privacy" option and block the transmission of their DN may in many cases defeat the objectives of the CND service. At a minimum, these drawbacks have, to date, hindered widespread consumer acceptance of the service.

Consequently, a need has developed to provide CND service subscribers with a method and system operative to automatically block telephone calls which either because of calling party option and/or unavailability, do not provide the called party with the desired Directory Number of the calling party. Such a method and system should work transparent to the called party so that at the called party's option, calls where the DN has been intentionally blocked are rejected. Alternatively, all calls which do not include DN information—including those where DN is simply unavailable—may be blocked.

DISCLOSURE OF THE INVENTION

It is therefore an object of the present invention to provide a method and system for detecting and processing calls from a calling party to a subscribing called party wherein the display of calling party ID information is not available or has been intentionally inhibited.

A more specific object of the present invention is the provision of such a method and system which is specifically adapted for use in an Advanced Intelligent Network (AIN) having at least one Service Switching Point (SSP) in electrical communication with a Service Control Point (SCP) or Adjunct Processor (AP) via an appropriate signaling link.

In carrying out the above-stated objects and other features and advantages of the present invention, there is provided a Service Control Point (SCP)/Adjunct Processor (AP) in electrical communication with at least one service Switching Point (SSP)/Central Office Switch in a Public Switched Telephone Network (PSTN) having AIN architecture.

In operation, the method of the present invention requires that the SSP be provisioned to detect an AIN termination attempt trigger when attempting to terminate a call from a calling party to a subscribing called party. Upon detection of this trigger, normal call processing is suspended and an AIN termination attempt message is generated at the SSP for receipt by the SCP/AP. This message includes a query requesting further call processing instructions from the SCP/AP.

By reference to the presentation field of the generic name parameter of the AIN termination attempt message, the service logic of the SCP/AP determines whether calling party ID information has been intentionally blocked in the incoming call. Alternatively, at the called party's option, the SCP/AP may also determine if the calling party ID information is simply unavailable. If so, a response message is generated at the SCP/AP for receipt by the SSP instructing the SSP to intercept the call, play a selected terminating announcement, or request the calling party to display its ID information and perform further call processing. In this latter step, a Send-to-Resource message is generated at the SCP/AP for receipt by the SSP. This message indicates the resource type as "play announcement and collect digits".

In the case where there has been intentional blocking, if the calling party thereafter responds with a willingness to provide caller ID information such as through DTMF prompts, etc., the caller's ID information will be detected at the SSP. Thereafter, an authorized termination message is generated at the SCP/AP for receipt by the SSP and the call is presented to the subscriber.

Also in accordance with the above stated objects, the system of the present invention is similarly provided for detecting and processing calls from a calling party to a subscribing called party wherein the display of calling party ID information is unavailable or has been intentionally inhibited. The system includes an SSP which is provided in electrical communication with the subscriber and the calling party for suspending normal call processing and generating a corresponding AIN termination attempt message upon detection of an AIN termination attempt trigger. The system further includes an SCP or AP provided in electrical communication with the SSP for receiving the AIN termination attempt message, determining whether the calling party ID information has been inhibited and generating a response message at the SCP/AP for receipt by the SSP instructing the SSP to intercept the call, play a selected terminating announcement or request the calling party to display its ID information and perform further call processing.

The above objects and other objects, features, and advantages of the present invention are readily apparent from the following detailed description of the best modes for carrying out the invention when taken in connection with the accompanying drawings wherein like reference numerals correspond to like components.

BEST MODES FOR CARRYING OUT THE INVENTION

Figure 1:
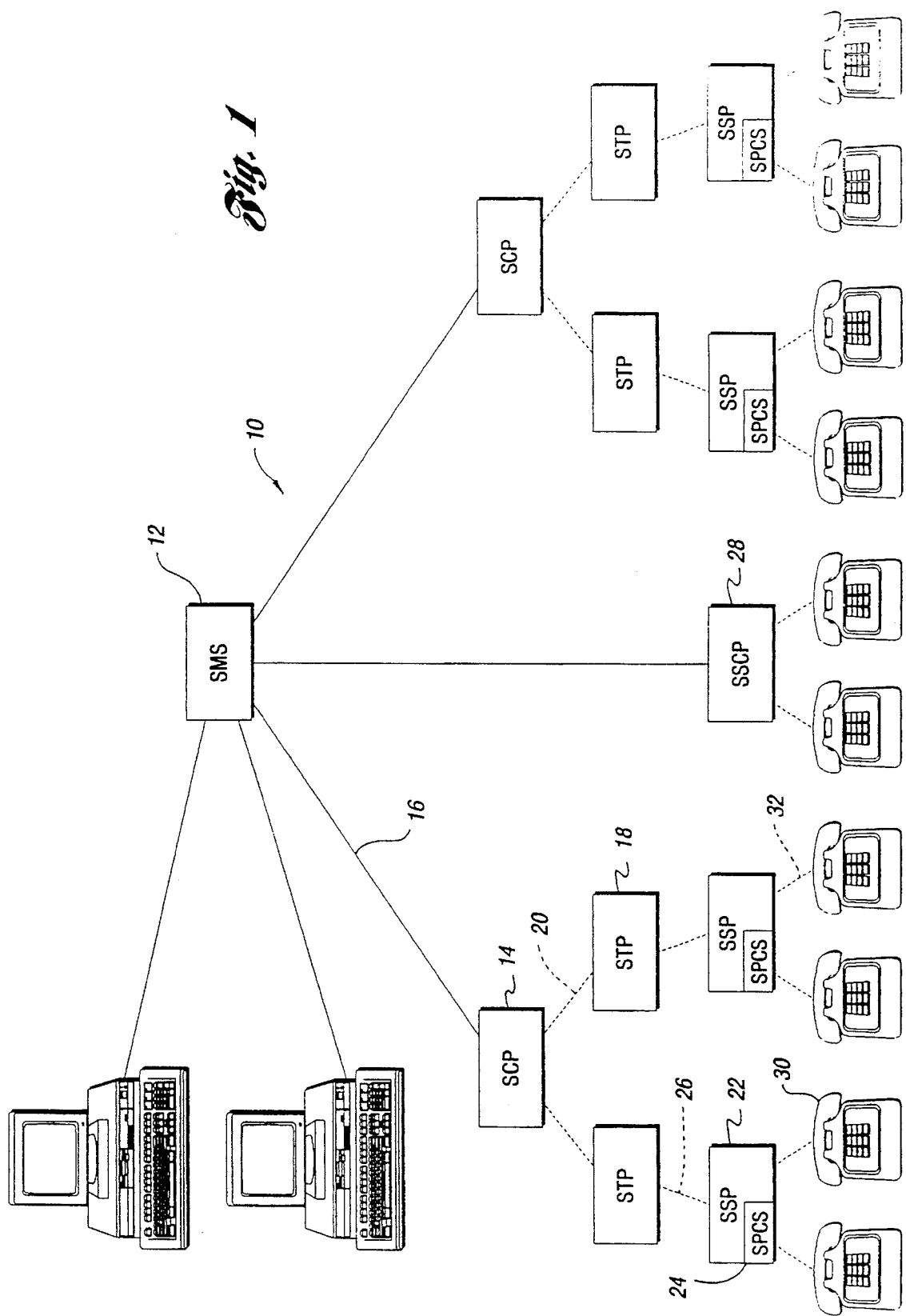
FIG. 1 is a block diagram of a representative Advanced Intelligent Network (AIN)

With reference to FIG. 1 of the drawings, a representative diagram of Advanced Intelligent Network (AIN) architecture is disclosed for use in a Public Switched Telephone Network (PSTN). The AIN architecture referred to is designated generally by reference numeral 10. As those skilled in the art will recognize, network architecture 10 is implemented with Common Channel Signaling System No. 7 (SS7) protocol.

Common Channel Signaling (CCS) is a method for exchanging information between Stored Program Control Systems (SPCSs) that are interconnected through a network of signaling links. CCS network nodes may include, but are not limited to switching systems, network databases, and operator services systems. As those skilled in the art will recognize, when implemented on an SPCS, CCS serves the dual role of (1) providing a transport mechanism necessary to carry feature information between the SPCS and other nodes in the CCS network; and (2) defining how service information shall be encoded to allow other nodes to correctly interpret CCS communications from the SPCS.

For interswitch calls, the protocol used for CCS is Signaling System No. 7 as referenced above. Designed to be used primarily high-speed digital networks, common channel Signaling System No. 7 is capable of controlling low-speed analog facilities as well. SS7 generally operates at 64 kbPS and can support variable message links up to 2,176 bits (272 octets) of information per message.

As those skilled in the art will recognize, the SS7 network is comprised of various packet switching elements and transmission links, some of which are shown in network architecture 10. As seen, there is provided Service Management System (SMS) 12 which generally comprises a computer-based system used to design service logic, to control logic implementation to the network, and to manage the network operation, such as monitoring traffic levels and collecting statistics and billing data. SMS 12 is provided in electrical communication with a plurality of Service Control Points (SCP)/Adjuncts 14 via management links 16. As those skilled in the art will further recognize, AIN Service Control Points 14 are nodes which contain the service logic and associated data support to execute the required customer services.

Still further, there is provided Signal Transfer Points (STP) 18 in electrical communication with SCP/Adjunct via signaling links 20. Service Transfer Points 18 are packet switches used to route signaling messages within the network. Service Switching Points (SSP) 22 are also provided. Again, as those skilled in the art will recognize, Service Switching Points 22 are generally nodes, usually the subscriber's local switch/central office switch (sometimes also referred to as End Offices) which recognize the "triggers" used when a subscriber invokes an Intelligent Network Service and then communicates with the SCP to operate the service.

As shown in FIG. 1, Service Switching Points 22 include SPCSs 24 and are provided in electrical communication with Signal Transfer Points 18 via signaling links 26. In limited traffic situations, Service Switching and Control Points (SSCP) also called Service Nodes (SN) 28 are also provided for combining the functions of the SCP and SSP. Finally, subscribers are provided, each having at least one Customer Premises Equipment (CPE) device 30 such as a telephone, facsimile machine, voice messaging peripheral, modem, or the like. As shown, CPE devices 30 are provided in electrical communication with Service Switching Points 22 via signaling links 32.

The AIN architecture referenced above is known to those skilled in the art to permit services to be extended through the network. In operation, new services are typically installed on two SCP processing platforms for directly servicing a selected market. In operation, this service management system extends management and control to the remote Service Control Points/Adjuncts via a network. In the case of AIN SCPs, those skilled in the art will recognize that the SCPs are directly connected to the SSP through normally signaling links. Adjunct processors, in contrast, are directly connected to the SSP with high-speed links.

Figure 2:
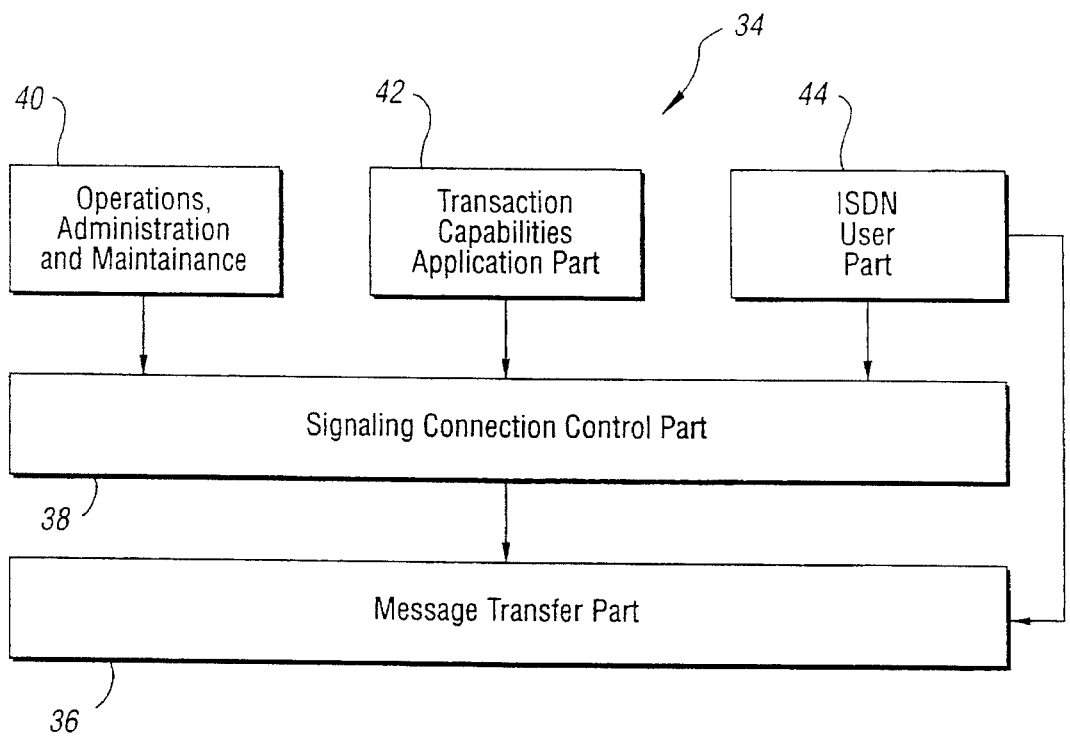
FIG. 2 is a schematic diagram of the SS7 protocol defined in a set of functional modules.

With reference now to FIG. 2 of the drawings, the SS7 protocol used by CND is shown defined in a set of functional models referred to generally by reference numeral 34. As seen, the SS7 protocol includes a Message Transfer Part (MTP) 36 which provides for reliable transfer of signaling messages. MTP functions include specifying signaling link physical characteristics, signaling error detection and recovery, basic CCS network management, and flow control. The model further includes Signaling Connection Control Part (SCCP) 38 which provides for communication between signaling nodes via virtual circuits as well as connectionless transfer capabilities. The SCCP 38 also provides specialized routing and management functions necessary to support routing to partitioned and/or duplicated databases. There is further provided Operations, Administration and Maintenance (OA&M) 40, the procedures of which are currently not defined.

Still further, there is provided Transaction Capabilities Application Part (TCAP) 42 which provides application-level functions for special CCS services provided by the SPCSs 24. In operation, service information exchanged between the SPCSs 24 and the network database are typically defined within Transaction Capabilities 42. Finally, Integrated Services Digital Network (ISDN) User Part 44 provides the application level communications necessary for a variety of signaling services, including call set-up and disconnect. Again, as recognized by those skilled in the art, because the SCCP 38 and the ISDN User Party 44 rely on the MTP 32 for message transport, these modules are referred to as "MTP-users." Similarly, Transaction Capabilities 42 are defined as an "SCCP-user".

In operation, the SPCS 24 derives the calling party DN from the address information field within the calling party address parameter of the Initial Address Message (IAM) for interoffice calls placed over trunks served by SS7. If the presentation indicator field and the calling party number parameter of the IAM is set to "00" (i.e., "presentation allowed"), the SPCS 24 transmits the calling party DN, along with the date and time, to the called party CPE 28. In contrast, if the presentation indicator field is set to "01" (i.e., "presentation restricted"), the SPCS transmits a "P" in place of the calling party DN, along with the date and time of the call, to the CPE 30. Similarly, if the calling party address information is required at the terminating office (i.e. a customer at that office has CND active, but is not present in the IAM), then no additional SS7 queries are made to obtain the desired information. An O/U indicator, along with the date and time, are sent to the CPE 30 in place of the calling party DN.

When calling party ID is sent, the SPCS 24 sends the calling line information, encoded in ACS II (American Standard Code for information interchange) to the CPE 30 using a single data message format known to those skilled in the art. The data words parameter of the message are populated with the first two digits representing the month, the next two digits representing the day of the month, the next two digits representing the hour and local military time, the next two digits indicating the minute within the hour, and the remaining digits identifying the calling party's directory number.

Figure 3:
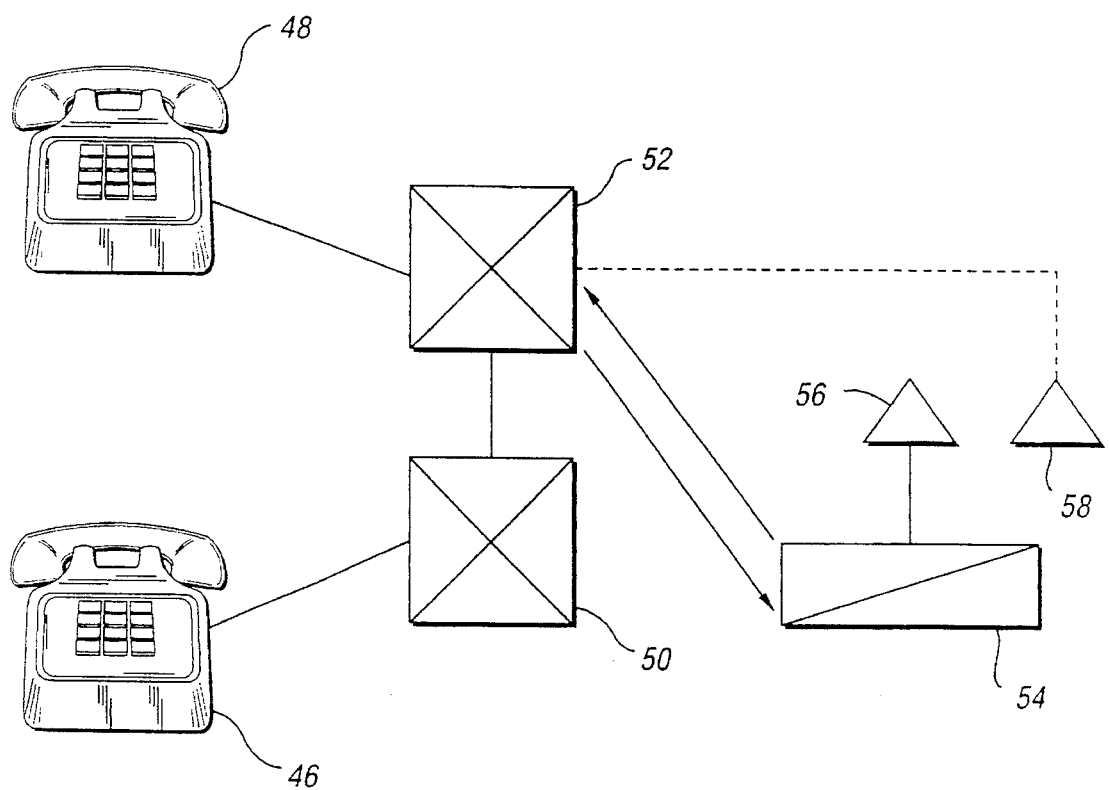
FIG. 3 is a schematic diagram of the system of the present invention.

With reference now to FIG. 3 of the drawings, the system of the present invention will be described in further detail. As shown, there is provided a calling party 46 and a subscriber or called party 48, both of which are represented by Customer Premises Equipment (CPE) devices represented by standard telephone icons. Calling party 46 is provided in electrical communication with a Central Office Switch (COS)/End Office (EO) 50 which, in turn, is provided in electrical communication with the End Office/ Central Office Switch 52 of subscriber 48. COS 50 includes a SPCS. As understood by those skilled in the art, the calling party 46 and the subscriber 48 may, of course, be connected to the same End Office.

Still referring to FIG. 3, the subscriber's SSP 52 is provided in electrical communication with a Service Transfer Point 54 via an appropriate signaling link such as Signaling System No. 7 which is described in further detail above. Signal Transfer Point 54 is, in turn, provided in electrical communication with an AIN SCP 56. Alternatively, an Adjunct Processor 58 may be connected directly to AIN SSP 52. As those skilled in the art will further recognize, the functions of the subscriber SSP 50, STP 54, and SCP/AP 56/58, may all be combined into a single component known as a Service Node as referenced above.

Figure 4:
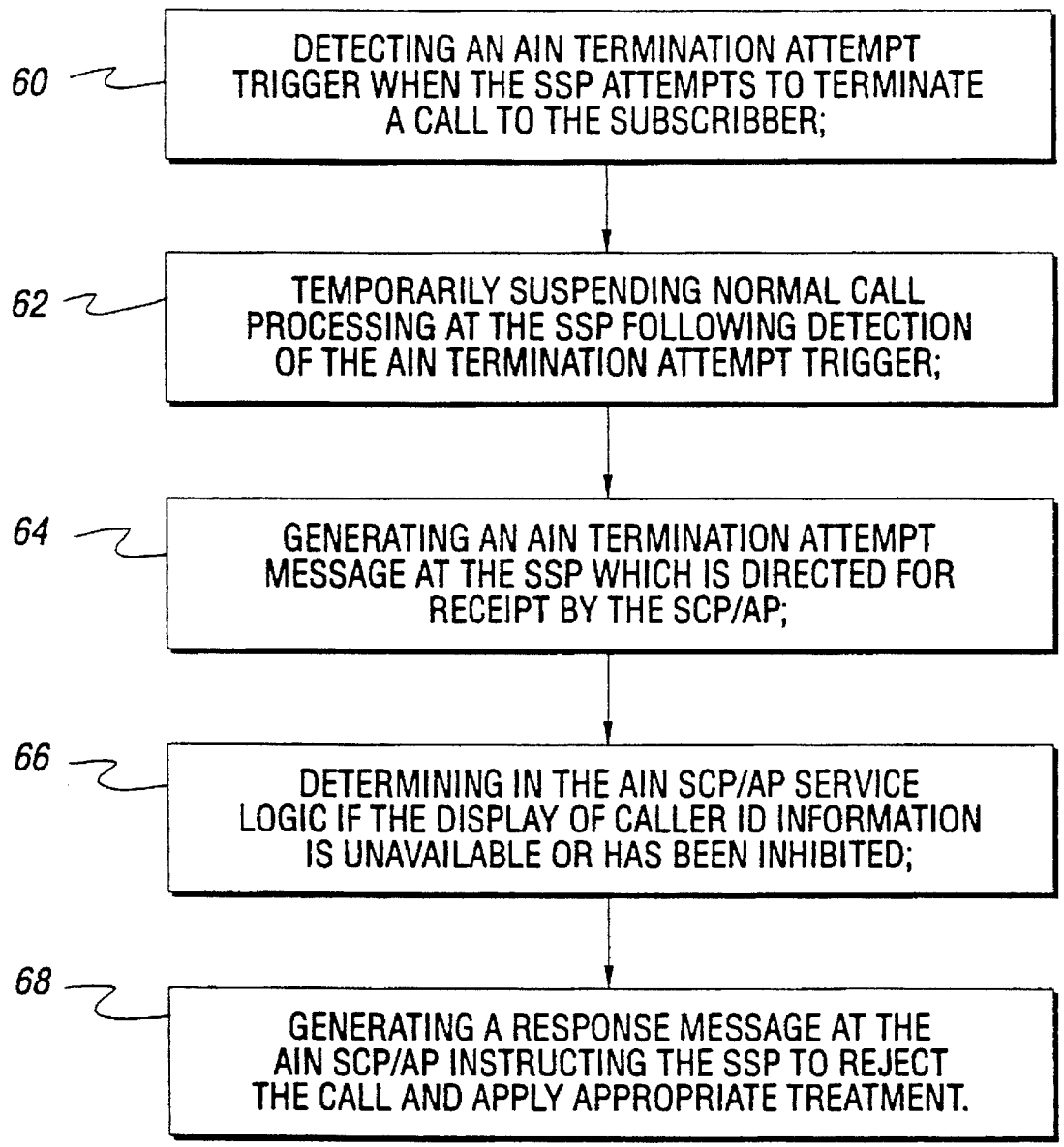
FIG. 4 is a generalized block diagram of the method steps of the present invention.

Turning now to FIG. 4 of the drawings, the method of operation of the system of the present invention may be further described. In operation, when SSP 52 attempts to terminate a call to the subscriber 48, it detects 60 an AIN termination attempt trigger. Normal call processing is thereafter suspended temporarily 62 at the SSP 52 following such detection. Once call processing is interrupted, SSP 52 is operative to generate 64 an AIN termination attempt message which is directed for receipt by SCP/AP 52/54. This message includes a request for further call processing instructions. The service logic contained in the AIN SCP/AP thereafter is operative to determine 66 if the display of caller ID information is unavailable or has been intentionally inhibited. This determination is accomplished by the SCP/ AP 56/58 service logic via reference to the presentation field of the generic name parameter of the AIN termination attempt message. Thus, in presently available CND systems, the service logic will look for the presence of "01" in the presentation field indicating that the presentation of DN information is "restricted" either because of incompatibility or the selection of the privacy option by the calling party.

If it is determined that the display of caller ID information is unavailable or has been intentionally blocked, the AIN SCP/AP 56/58 will, at the called party's option, respond back to the SSP 52 by generating 68 a response message such as, for example, Send-to-Resource message, Disconnect message, etc. instructing SSP 52 to reject the call and apply appropriate treatment. Such treatment may require SSP 52 to intercept the call or, in alternative embodiments, play a selected terminating announcement, or request the calling party to display its ID information, if possible, so that further call processing may be performed.

Significantly, in the preferred embodiment, these requests and actions are designed to take place transparently, i.e. without the knowledge of the called party. Thus, the called party will only be advised, i.e. by ringing of telephone calls which transmit their corresponding directory numbers. Incomplete calls or calls which have been initiated with the "privacy" feature will be intercepted. In effect, "the blockers will be blocked".

Figure 5:
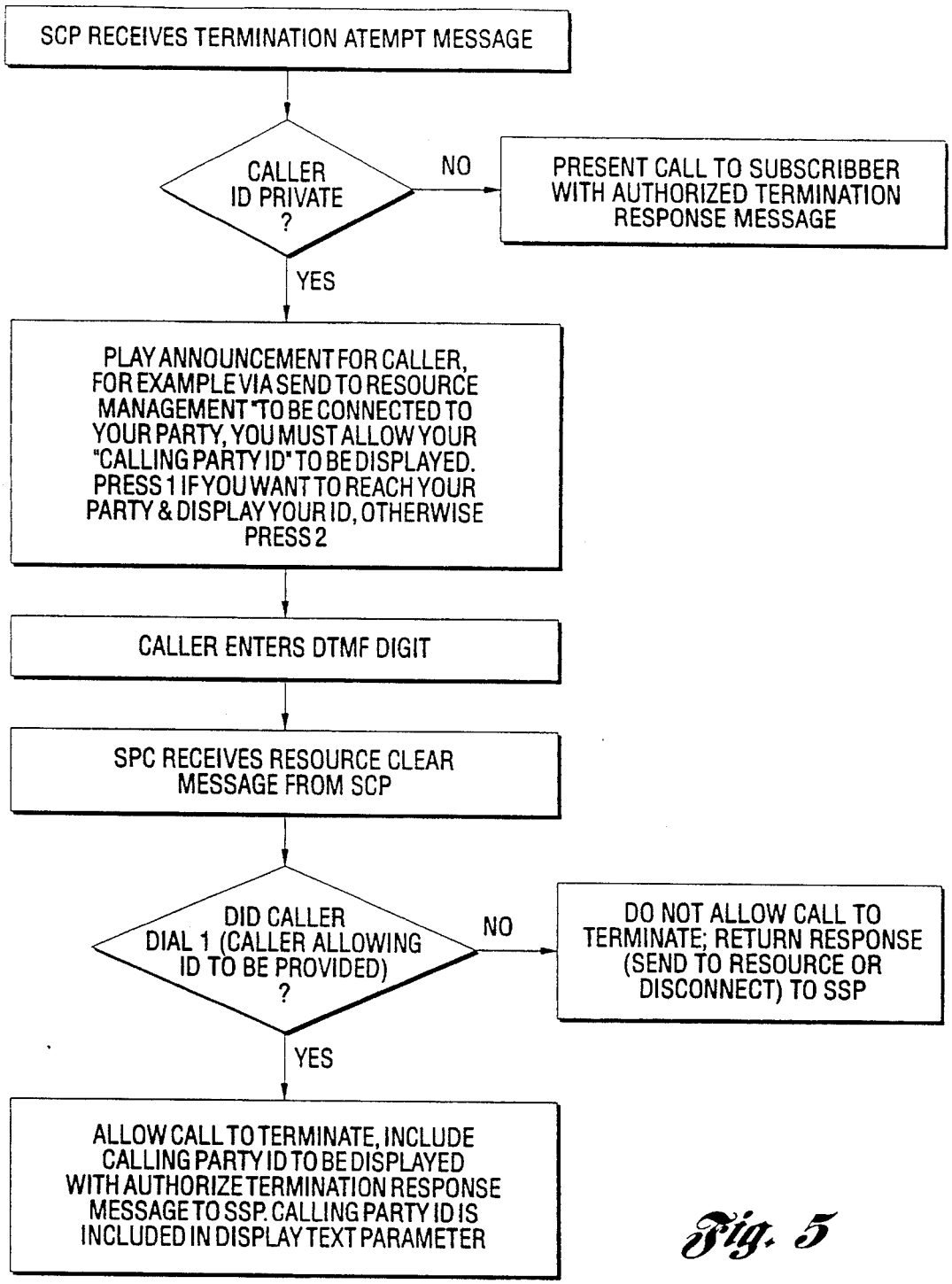
FIG. 5 is a flow chart of the method operation of the present invention.

The Send-to-Resource message which is generated at the SCP/AP 56/58 for receipt by the SSP 52 includes an indication that the resource type is "play announcement and collect digits". If the caller desires to display its ID information as indicated by a Dual Tone Multi-Frequency (DTMF) entry, digital voice answer with voice recognition capabilities, or other simple response, the call may then be presented to the subscriber with an authorized termination message generated by the SCP/AP 56/58 for receipt by SSP 52. A flow chart which is further illustrative of the method of the present invention is provided in FIG. 5.

It should be understood that the present invention is not intended to be limited to the use of an AIN SCP or service concepts as generally disclosed herein. Thus, as discussed above, an AIN adjunct 58 may be used in place of the AIN SCP 56. Still further, an AIN Service Node (not shown) may also be provided with the same functionality as SSP 52 and SCP 56/Adjunct Processor 58.

More particularly, the present invention is directed to the use of AIN triggers and messaging to detect if the caller ID information is either unavailable or has been inhibited from display, and if so, the caller should receive appropriate treatment. In such manner, the true objectives of CND will be achieved and called parties will be provided with the desired Directory Number information of all terminating telephone calls.

While the best modes for carrying out the invention have been described in detail, those familiar with the art to which this invention relates will recognize various alternative designs and embodiments for practicing the invention as defined by the following claims.

What is claimed is:

1. For use in an Advanced Intelligent Network (AIN) having at least one Service Switching Point (SSP) in electrical communication with a Service Control Point (SCP) or Adjunct Processor (AP) via an appropriate signalling link, said SCP/AP having corresponding service logic, a method for detecting and processing calls from a calling party to a subscribing called party wherein the display of calling party ID information is unavailable or has been inhibited, comprising:

detecting an AIN Termination Attempt trigger at said SSP when attempting to terminate a call from said calling party to said subscribing called party;

suspending normal call processing at said SSP upon detection of said AIN Termination Attempt trigger;

generating an AIN Termination Attempt message at said SSP for receipt by said SCP/AP, said AIN Termination Attempt message requesting further call processing instructions;

determining at said SCP/AP whether said calling party ID information has been inhibited; and if said calling party ID information has been inhibited, generating a predetermined response message at said SCP/AP for receipt by said SSP instructing said SSP to intercept said call, play a selected terminating announcement or request said calling party to display its ID information and perform further call processing.

2. The method of claim 1, wherein said AIN Termination Attempt message includes a Generic Name parameter having a presentation field operable to indicate whether calling party ID information will be displayed or inhibited.

3. The method of claim 2, wherein the step of determining whether said calling party ID information has been inhibited is accomplished by said SCP/AP service logic via reference to said presentation field of said Generic Name parameter of said AIN Termination Attempt message.

4. The method of claim 1, wherein the step of requesting said calling party to display its ID information and perform further call processing, comprises:

generating a Send To Resource message at said SCP/AP for receipt by said SSP, said Send To Resource message indicating the resource type as "Play Announcement and Collect Digits";

detecting said caller's ID information at said SSP; and generating an Authorize Termination message at said SCP/AP for receipt by said SSP and presenting said call to said subscriber.

5. The method of claim 1, wherein the step of playing a selected terminating announcement is accomplished by activating an AIN Intelligent Peripheral.

6. For use in an Advanced Intelligent Network (AIN) having at least one Service Node (SN) having corresponding service logic, a method for detecting and processing calls from a calling party to a subscribing called party wherein the display of calling party ID information has been inhibited, comprising:

detecting an AIN Termination Attempt trigger at said SN when attempting to terminate a call to said subscribing called party;

suspending normal call processing at said SN upon detection of said AIN Termination Attempt trigger;

determining at said SN whether said calling party ID information has been inhibited; and if said calling party ID information has been inhibited, intercepting said call, playing a selected terminating announcement or requesting said calling party to display its ID information and perform further call processing at said SN.

7. For use in an Advanced Intelligent Network (AIN), a system for detecting and processing calls from a calling party to a subscribing called party wherein the display of calling party ID information has been inhibited, comprising:

a Service Switching Point (SSP) in electrical communication with said subscribing called party and said calling party for suspending normal call processing and generating a corresponding AIN Termination Attempt message upon detection of an AIN Termination Attempt trigger;

a Service Control Point (SCP) or Adjunct Processor (AP) in electrical communication with said SSP for receiving said AIN Termination Attempt message, determining whether said calling party ID information has been inhibited and generating a response message at said SCP/AP for receipt by said SSP instructing said SSP to intercept said call, play a selected terminating announcement or request said calling party to display its ID information and perform further call processing.

* * * * *